Sept. 13, 1932.     S. I. SAX     1,877,598
METHOD AND APPARATUS FOR AUTOMATIC PHOTOGRAPHIC PORTRAIT CAMERAS
Filed Feb. 11, 1931     4 Sheets-Sheet 1

INVENTOR,
Samuel I. Sax,
BY
Harold D. Penney, ATTORNEY

Sept. 13, 1932.   S. I. SAX   1,877,598
METHOD AND APPARATUS FOR AUTOMATIC PHOTOGRAPHIC PORTRAIT CAMERAS
Filed Feb. 11, 1931   4 Sheets-Sheet 2

INVENTOR,
Samuel I. Sax,
BY
Harold D. Penney / ATTORNEY.

Patented Sept. 13, 1932

1,877,598

UNITED STATES PATENT OFFICE

SAMUEL I. SAX, OF NEW YORK, N. Y.

METHOD AND APPARATUS FOR AUTOMATIC PHOTOGRAPHIC PORTRAIT CAMERAS

Application filed February 11, 1931. Serial No. 514,974.

The present invention relates to an improvement in method and apparatus for portrait photographing cameras, and has for its principal object the provision of means whereby portraits may be automatically and speedily taken in separate sequence, each upon a separate plate or film of a magazine held set of such, the said apparatus being so constructed as to be manually controlled to set up, after focusing, the desired automatically operated picture viewing, exposure, and film manipulating sequences.

As is well known in this art, usually a plurality of "poses" are taken of a single individual at one sitting, and by the hereinafter outlined description, it will be ascertained how this is accomplished with a minimum of time, in timed, controlled intervals.

The present construction also permits of a speedy operation or set of operations whereby a set of series of exposures or poses of a plurality of different individuals may be separately exposed at a great saving of time, and thereafter easily identified as to the individual to whom they relate.

My automatic camera may be supplied with a precharged magazine for holding a desired number of plates or films carried in individual frames shiftable after each individual exposure onto a top storage pack from a bottom pack, said frames being yieldingly held in top and bottom packs and being introduced and withdrawn from the back of the magazine.
Another object of the invention being to provide means whereby the subject may be focused by observation from the side of the camera.

A prominent feature of the invention is in the provision of air pressure means produced by a hand bulb for performing three distinct functions, two directly and the third indirectly. First for releasing a reflecting focal plate to permit its folding movement out of the lens field, second this movement operating a lever to release the shutter to make an exposure, and third, to set and close a motor controlling snap switch, which motor through connections, continues the sequence of operations by lifting the exposed film to the pack of exposed films for storage, resets the focusing plate and shutter and trips the snap switch to disconnect its circuit and stop the motor.

For the accomplishment of these and such further objects as will be apparent to those skilled in this art, I preferably employ the following construction set forth and illustrated in the accompanying drawings, but it will be understood that variations of structure and arrangement of the parts may be resorted to within the scope of the invention claimed.

Referring to the drawings in detail, the back B of the camera carries a magazine M, which is preferably secured to said back by suitable pin and slot means m, m, at the top and bottom thereof, and the front or lens box of the camera F, may be secured to the back B in the usual or any preferred manner.

The back B takes the form of a box-like structure having a top 20, a bottom 21, sides 22 and 23, a back 24 and a front 25, which has an exposure opening 26. The side 23 of the box-like structure has a focusing opening 27, closed by a ground or translucent glass screen 28, preferably held in place by pivoted clips 29, or by other suitable means.

Figure 4:
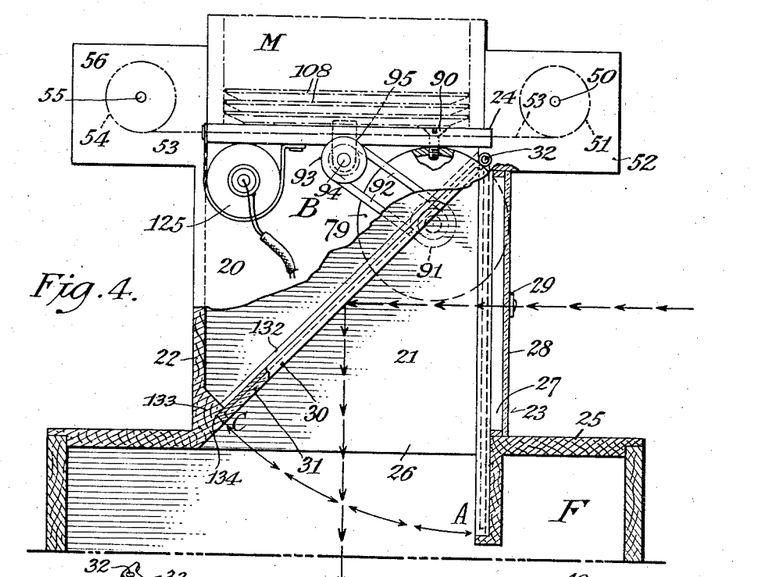
Fig. 4 is a diagrammatic partial sectional plan view of the camera back with the focusing device in operative position.
Figure 5:
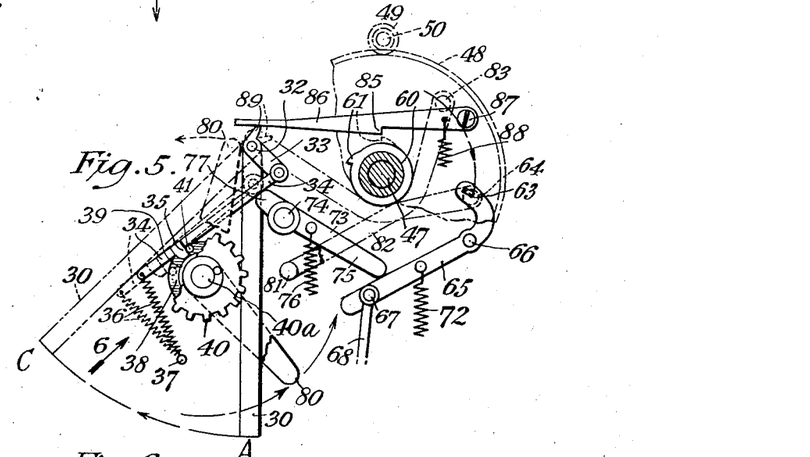
Fig. 5 is a fragmental view of the tripping mechanism to better indicate in dotted lines, the movement of a tripper bar, with respect to a motor driven part when coacting in moving the focusing mirror or plate from the folded to the focusing positions.
Figure 6:
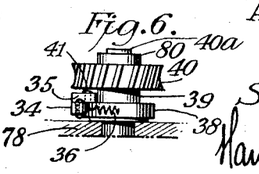
Fig. 6 is a detail side elevation of the above mentioned motor driven part, and looking in the direction of the arrow 6 of Fig. 5.

Pivoted within the camera back, at one rear corner of the exposure opening 26, is a frame 30 in which is supported a pivoted reflecting mirror or focal plate 31, said frame being secured at its rear edge to a hinge bar 32, which is mounted to project slightly above the top 20 of the camera back, and to which is affixed a short horizontal arm 33, to which a link 34 provided with a shoulder 35, is pivoted, see Fig. 5, and to the end of said link 34, one end of a pull spring 36, is attached; its other end being anchored as at 37, to exert a constant pull on said link thus causing its constant engagement with the periphery of a disk 38, formed on a hub 39, with a worm gear 40, which is driven by a motor as hereinafter described around a fixed spindle 40a. The disk 38 also carries a drag-pin 41, which engages the said shoulder in the operation of the motor to draw the mirror and its frame from the open or folded position shown at A, Figs. 4 and 5 to the closed position C, after which the shoulder 35 leaves the drag pin 41 as indicated in dotted lines in Fig. 5, said pin continuing its rotary movement, and said link and its shoulder being drawn back to the full line position, to engage said drag-pin when it again comes around; and this operation is repeated over and over again in the operation of the tripper parts, as hereinafter described for swinging the mirror to one extreme position for focusing and to the opposite extreme position to permit of an exposure in alternate cycles, as the hand bulb is pressed to trip the said mechanism.

Figure 7:
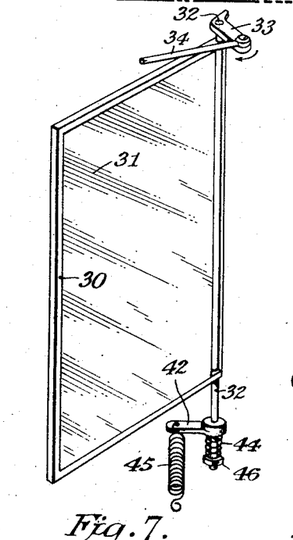
Fig. 7 is a detail perspective view of the focusing mirror or plate and showing a controlling link by which said mirror may be moved to the focusing position and an attached arm and a spring for swinging said mirror to the folded position when the tripping mechanism is released.

The lower end of the hinge bar 32 (see best Figs. 1 and 7) is provided with an arm 42, disposed below preferably felt washers 43 thrust upwardly against the bottom B by a push spring 44, which provides considerable friction against said bottom to slow up the folding or opening movement of the mirror induced by a pull spring 45 fast to said arm 42, when the tripping mechanism is released. The spring 44 is confined by a nut 46 by which friction may be adjusted.

I will now proceed to describe the mechanism for controlling the shutter and those elements of the tripping mechanism not heretofore described.

Mounted to rotate on a fixed spindle 47, is a horizontally arranged gear wheel 48, meshing with a gear pinion 49, affixed to a rotary shaft 50, extending through a shutter storing roller 51, and journalled in the top and bottom walls of a roller casing 52 extending from one side of the box-like back of the camera. Attached to this roller 51, as at 51a, see Fig. 2, is a strip shutter 53, normally wound around said roller against the tension of a helical spring 57. Journaled in the top and bottom walls of a companion roller casing 56, at the opposite side of the camera, is another roller 54 having a shaft 55, which is carried above the top wall of this casing 56 and is made fast to the inner end of the helical spring 57, having its outer end anchored to said casing top as at 58', see Fig. 3. By this arrangement, said spring may cause the rapid operation of the gear wheel 48 in one direction, and will rapidly draw the shutter strip having the usual exposure opening (not shown) across the exposure opening 26, from roller 51 to roller 54, upon release of the gear 48 by the tripper mechanism; but prior to the shutter movement the focusing panel or mirror will be released, permitting its spring 45, (Figs. 1 and 7) to swing the mirror 31 toward the folded position, and when said mirror, in its cross travel, has passed the lens field, the spring 57, will draw or snap the shutter 53, across the exposure opening 21 to make an exposure.

The tripping means for releasing the mirror from its closed position; for operating the motor; and for making time exposures, will now be described.

The gear wheel 48, has a hub 60, formed with a shoulder 61, and said gear also has a downwardly directed stop 62 (see Fig. 2) adapted in the exposure movement of said gear to contact with an upright lug 63, on the free end 64 of an oscillatory lever 65, and this contact is held to retard the shutter as desired for a time exposure and may be released by releasing the bulb, the upright lug 63 may however be made adjustable if desired for instantaneous exposures. This lever 65, oscillates around a center pin 66, and has pivotal connection at 67, with a piston rod 68 which in turn is connected pivotally to an air piston 69 operated in a cylinder 70, (as shown in Fig. 2,) by air pressure induced by pressing the air bulb 58, said pressure passing through suitably connected flexible tubing 71. A spring 72 has a downward pull, as in Figs. 1, 2 and 3, on the lever 65, and through the link 68, urges the piston 69 against the lower end of the cylinder 70.

A trip lever 73, is rockable on a pin 74, and comprises a tail portion 75, which is held in constant contact with the oscillatory lever 65 by a pull spring 76, and also includes a nose portion 77, having a rounded end for the purpose of engaging the outer rounded end of the short arm 33 at the top of the mirror hinge bar 32, to maintain the mirror closed, or in its operative position extending diagonally across the exposure opening of the camera back, as shown in Fig. 2, when the focusing may be done. A metal plate 78 is secured to the top B of the structure to support most of the operative parts.

Secured to the worm wheel 40 and rotatable therewith, is a sweep-arm 80, which when the motor 79 is in operation and nearing the end of its full turn, acts to strike a post 81, on the end of a bent arm 82 pivoted at 83 to the gear 48, and held midway of its length against the hub 60 of the gear by a pull spring 84, and in this operation, said sweep arm carries the free end of the bent arm upwardly thereby turning the gear 48 in the direction of the arrow G of Fig. 2, to rotate the gear pinion 49, and wind the shutter 53 onto the roller 51 and at the same time causing the shoulder 61 on the hub 60, to be carried around under and behind a shoulder 85 on a shutter release arm 86, pivoted at 87, and urged against the hub 60 by a pull spring 88, (see Fig. 2), the free end of this release arm resting on a lug or nose 89 on the short arm 33 on the mirror hinge bar 32, as in the said Fig. 2.

Figures 3, 12:
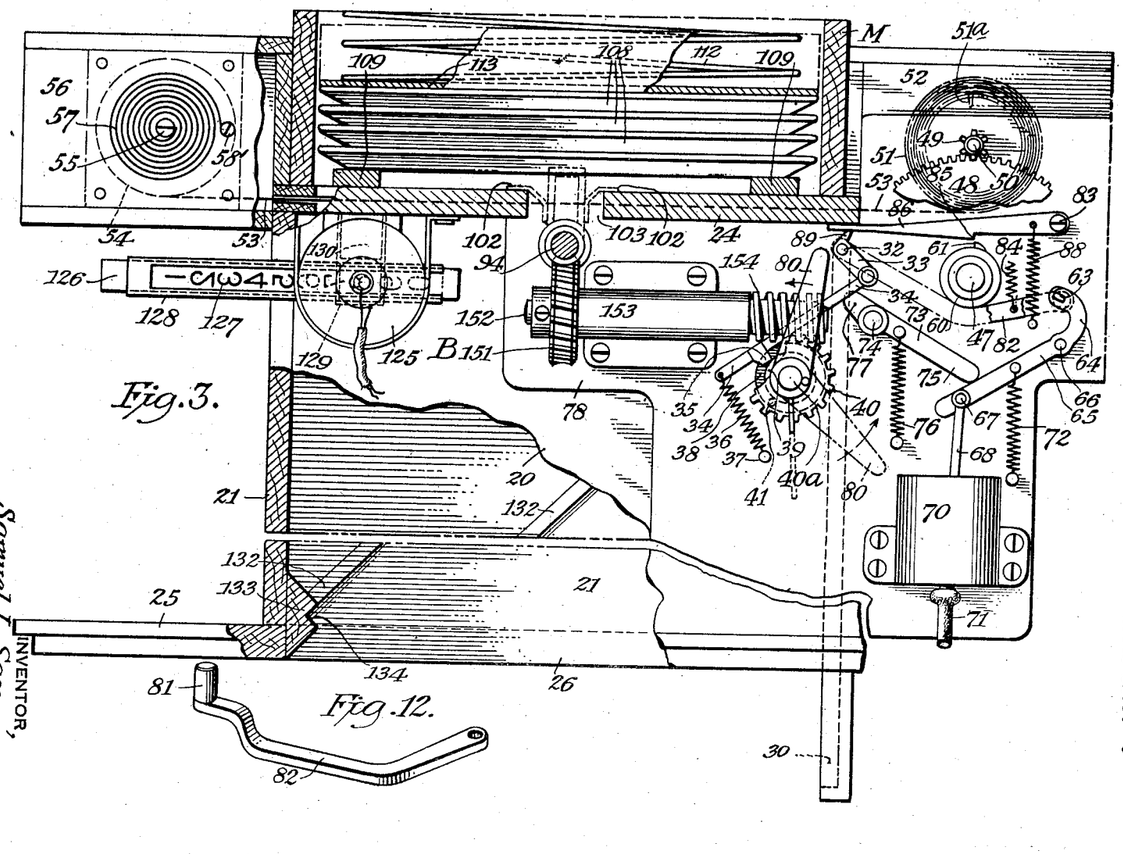
Fig. 3 is a view similar to Fig. 2, but with the parts in the position when the exposure is about to be made and the reflecting focal plate folded out of the lens field.
Fig. 12 is a detail perspective view of a shutter resetting arm, forming part of the tripping mechanism.

Thus, when the shoulder 61 of the gear hub 60, is interlocked with the shoulder 85 of the shutter release arm 86, the shutter is wound on roller 51 and held against the tension of the helical spring 57 at the opposite side of the camera, but in Fig. 3, the said shutter 53 is shown at the instant the shoulders 61 and 85 have been released by the folding swing of the mirror, causing the said nose 89 to lift the shutter release bar 86 permitting the shutter to be drawn back onto the roller 54, by the said spring 57, to make an exposure.

Figures 1, 8, 9, 10, 11:
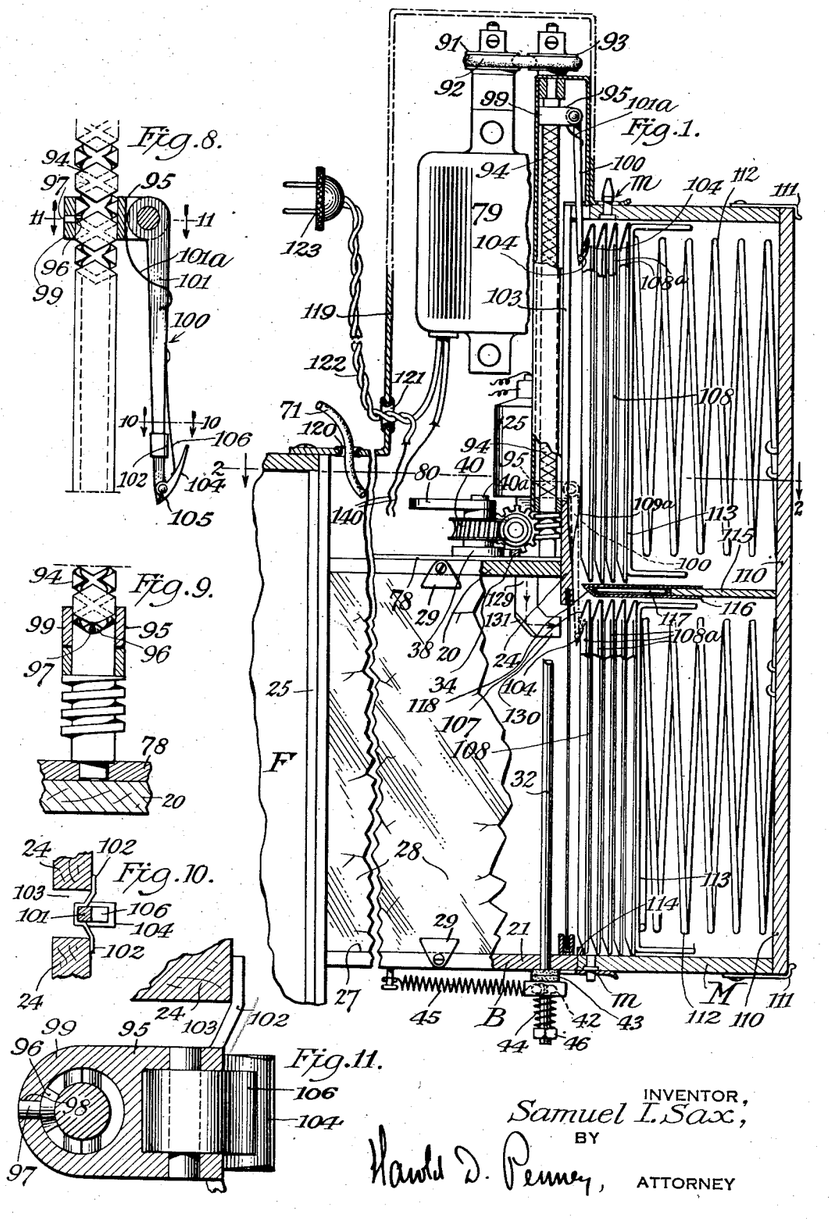
Fig. 1 is a partial vertical sectional elevation of the improved camera back, with parts broken away and omitted, and with the motor controlled film frame lifting hook in its upper or starting position after having previously raised an exposed film to the upper pack of films in the magazine from the lower dotted position.
Fig. 8 is an enlarged partial sectional detail showing a portion of the reversing drive screw and the film lifting hook suspended from its reversing nut support.
Fig. 9 is a fragmental detail showing the lower end of the reversing screw and the dog nut passing across the screw in the act of reversing the movement of the hook supporting nut for lifting the exposed films in the magazine.
Fig. 10 is a detail cross section on the line 10—10 of Fig. 8, and showing the relative working position of the shank of the hook in a slot provided for the purpose.
Fig. 11 is an enlarged detail cross section, taken on the line 11—11 of Fig. 8, to more clearly show the swiveled dog nut employed in engagement with the cross grooves of the reversing screw.
Figures 2, 13:
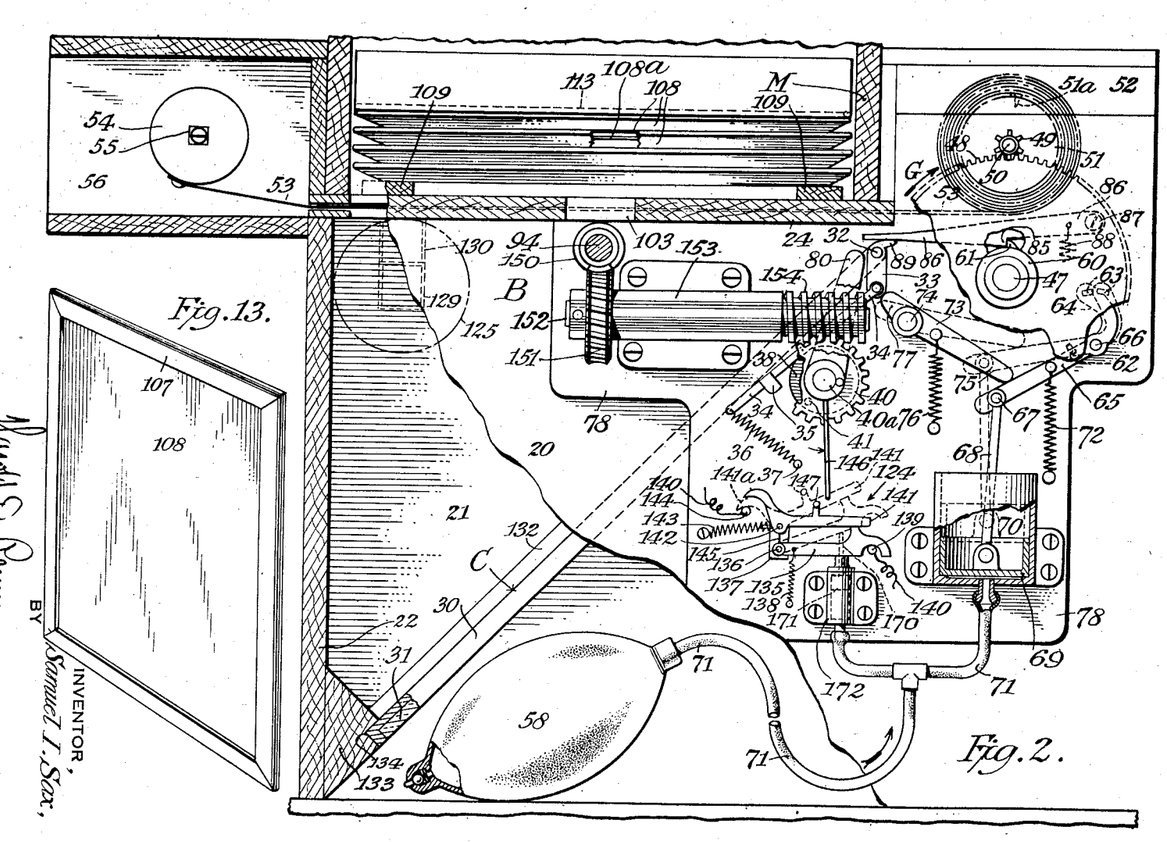
Fig. 2 is an enlarged sectional plan view taken about on the line 2—2 of Fig. 1 with parts omitted and showing the parts in the focusing position ready for release by hand operated pressure controlled tripping devices for making an exposure.
Fig. 13 is a perspective view of the film holder.

The motor 79, (as in Fig. 4) is shown as secured to the back 24, by one or more screws 90, and is supplied with a grooved pulley 91, to receive a belt 92 operating over a companion pulley 93, affixed to a reversing feed screw 94 (see Fig. 1) on which a nut 95 travels down and up at high speed, and is automatically reversed at the opposite limits of its travel by an oppositely pointed dog 96 having a shank 97, extending radially through a bore 98, in the nut casing 99 whereby said dog may pivot across the feed screw in a curve at the ends of the screw 94 to reverse the movement of the said nut as shown in Fig. 9.

Pivotally suspended from the nut 95, is a lifting hook 100, comprising a shank 101 (see Fig. 8) having outstanding laterally directed arms 102, (Fig. 10) near its free end, adapted to rest and slide upon the rear face of the back 24 to prevent said shank 101 from swinging into a slot 103 provided for the free passage of the nut 95 in its downward and upward movements. At its end, the shank 101 carries a hook 104, pivoted thereto by an elbow joint 105, to prevent the hook from swinging outwardly further than a spring 106, may urge it, but said hook may fold against the said shank on the downward movements of the nut 95, and is snapped backwardly by said spring, when it reaches the lower most position directly after an exposure has been made to engage under the upper side fold 107 of the forwardmost film carrying frame 108, shown best in Fig. 12. The action of the reversing parts is such that at this moment, the movement of the nut 95 and its hook will be reversed and started upwardly with the exposed film 108a (Fig. 1) and its frame, said frame being drawn upwardly in front of the forwardmost frame carrying the stored exposed films, thus forcing the said stored frames backwardly as each exposed film is raised in its frame to the storage point on vertical cleats 109, see best Figs. 2 and 3; the lower ends of said cleats having guiding bevels 109a see Fig. 1.

My improved magazine M as shown has an open front and a removable back 110, held in place by suitable spring catches 111 and secured to the back are companion spiral springs 112, which bear against follower plates 113, urging the front one of a pack of film carrying frames in the lower part of the magazine against an inwardly extending rib 114 (Fig. 1) which extends along the bottom edge and partially up the sides of the magazine, and substantially centrally of its height within said magazine is a partition 115, to divide the unexposed and exposed packs of films and their frame; this partition has a yielding front portion 116, containing a spring 117, and said front portion has a beveled front edge 118, which guides the successive top edges of the lower film frames between the guiding ribs 109 on the back 24 of the camera and the front film frame of the upper pack, so that when the lower frames are lifted, they successively occupy the front position in the said upper pack.

The operative parts, including the motor may be protected by a suitable housing 119, preferably of sheet metal which is attached to the camera front and the top of the magazine as shown or by any suitable fastening devices and said housing may be provided with a suitable opening 120 through which a bulb tube 71 may pass and another opening 121 may be provided, through which the motor feed conductors 122 connected with a plug 123 may be passed; one of said conductors being connected to the motor 79, and the other to a bulb controlled motor switch 124, presently described.

I have provided a simple means operable in connection with my improved camera back for indexing the films as they are presented for exposure. This indexing means may comprise an electric light 125 (Figs. 1 and 3) connected as desired with the motor circuit or otherwise, to flash a number, letter or other character through a stencil strip 126, here shown as having punched out numerals 127, 1 2 3 4 5—0 and extending through a guide holder 128 to intersect the rays from said light 125, which rays are in registration with a downwardly directed tube 129 (Fig. 1) having a right angle extension 130, and at the junction of said tube and extension, a reflecting lens 131, is arranged at a 45 degree angle to bend the said vertical light beam to the horizontal and onto the film to be exposed.

The flashing of this electric light as above stated may be timed as desired relative to the upward movement of an exposed film, and the stencil strip 126 may be adjusted in its holder to change the number to be projected as desired.

To prevent light passing backwardly to the unexposed films, I provide the top and bottom of the exposure opening 21 with diagonal strips 132, against which the mirror rests when in the focusing position, (the bottom strip only being shown) and a triangular post 133 having a rabbet or groove 134 into which the end of the mirror frame 30 snugly fits to form a step joint, as best shown in Fig. 2.

The motor control switch 124, as in Fig. 2, may comprise a lever 135 pivoted at 136 on an insulated block 137 and a pull spring 138, normally maintains the opposite or free end of said lever in contact with a terminal post 139 of the motor circuit as at 140; an oscillatory coordinating bar 141 is pivoted at 142 and is held in one of two positions by a push or snap spring 143, and in the dotted position indicated at 141a, an end thereof bears against another post 144 forming the other terminal of the motor circuit 140, and in the operation of the motor, when the switch is closed by contact of the levers 135 and 141 with their respective terminal posts 139 and 144 and through a wire 145 connecting the said levers at the pivot points, the motor circuit will be closed. When a trip finger 146, rotating with the worm gear 40 strikes an upright pin 147 on said oscillatory lever 141 it will trip it over to the full line position, thus breaking the circuit and stopping the motor.

Attached to the lower end of the reversible feed screw 94, is a worm 150 meshing with a worm wheel 151, affixed to a horizontally arranged shaft 152, operating in a bearing 153, and carrying in fixed relation a worm 154, which drives the worm wheel 40, to which the sweep-arm 80 and the trip-arm 146 are attached and said arms are rotated, by the operation of the motor 79, and to complete the operative steps of the camera mechanism, the said arms must travel through a complete turn as each exposure is made.

The snap switch 125 is controlled and set to close the motor circuit 140, by a plunger pin 170, operated by a piston 171, in an air cylinder 172.

Briefly the operation may be described as follows: normally the parts are in the position of Fig. 2. The bulb 58, is pressed to cause the air in the cylinders 70 and 72 to move the parts 65, 73, 135 and 141 to the dotted line positions; this operation moves the stop lug 63 on the lever 65 into the path of the downwardly directly lug 62 on the gear wheel 48, to hold the shutter opening in registration with the exposure opening 21 momentarily for a time exposure but previous to the final releasing of the shutter, the nose 77 of lever 73 has released the arm 33 of the focal panel, permitting the spring 45, to snap the said panel to the folded position, this movement being slightly retarded by the friction washers 43, bearing upwardly on the bottom 21 of the camera. When the exposure has been made the bulb is released, breaking the air pressure and permitting springs 72, 76 and 138 to return the parts 65, 73 and 135 to normal positions, and in this action the oscillatory bar 141, is held in the dotted position to establish the circuit 140 to start the motor; the film elevating hook 100 is now lowered to pick up the exposed film and carry it up to the exposed film pack for storage, the sweep arm 80, strikes the end 81 of the arm 82 and carries it up to the dot and dash position (see Fig. 5) at the same time the drag pin 41, on the disk 38, is engaging the shoulder 35 to reset the focal plate to the dotted position C and then the trip arm 146 (Fig. 2) engages a pin 147 on the member 141 to break the motor circuit and stop the motor.

While I have here shown the manually operated initiating means as an air bulb of known type it is obvious that the well known Bowdoin wire controls may be substituted therefor, as is known practice.

Further, while, for a complete understanding of the herein device it has been described as being directed to a portrait camera it is obvious that, in general, the present device is capable of other uses as a camera, and, is not to be narrowly construed to be directed to portrait cameras alone.

The manually controlled pressure generating bulb 58 and connections, and the electro-responsive motor 79 and connections, respectively constitute primary and secondary motive means for effecting the sequential operations of the active camera parts.

What I claim is:

1. In a high speed magazine camera, means for storing exposed and unexposed films, a shutter; a power unit; pressure means for releasing the shutter to make an exposure, means subsequently operable by said pressure means for operating the power unit, said unit having connections for progressively moving at each of its operations the exposed film from its position when exposed to the storage means, and means for automatically resetting the said shutter for a subsequent exposure.

2. In a high speed magazine camera, means for storing exposed and unexposed individual films in packs; a shutter; a power unit; manually operated pressure means for releasing the shutter to make an exposure, means subsequently operable by said pressure means for operating the power unit, said unit having connections for progressively moving at each of its operations an exposed individual film from its position when exposed to the front of a pack of exposed films for storage, and means for resetting the said shutter for a subsequent exposure.

3. In a high speed magazine camera, means for storing exposed and unexposed films, a shutter; a power unit; a focal mirror; co-ordinating tripping and releasing means, and means controlled by hand bulb pressure for sequentially releasing the focal mirror, releasing the shutter to make an exposure, and for starting the power unit; means operable by the power unit for moving an exposed film to said storage means, means for resetting the focal mirror, means for resetting the shutter and means for stopping said power unit.

4. In a high speed magazine camera, means for storing exposed and unexposed films in packs, a shutter; a power unit; a focal mirror; coordinating tripping and releasing means, and means controlled by hand bulb pressure for sequentially releasing the focal mirror, releasing the shutter to make an exposure, for starting the power unit, means operable by the power unit for moving the exposed film to an exposed film pack, means for resetting the focal mirror, means for resetting the shutter and means for stopping said power unit.

5. In a high speed automatic camera having an exposure opening, means for progressively presenting unexposed films at said opening, means extending across the exposure opening for focusing the subject, a normally tensioned shutter, a motor, and manually controlled means for sequentially releasing the focusing means permitting it to move clear of the lens field, for releasing the shutter to make an exposure, for operating the motor, and means associated with said motor for moving the exposed film to an unexposed position, for resetting the shutter, and for stopping the motor.

6. In a high speed automatic camera having an exposure opening, means for progressively presenting individual films at said opening, means extending across the exposure opening for focusing the subject, a normally tensioned shutter, a motor, and hand bulb generated and controlled pressure means for releasing the focusing means permitting it to move clear of the lens field, for releasing the shutter to make an exposure, and for operating the motor, means associated with said motor for moving the exposed film to an unexposed position, for resetting the shutter, and for stopping the motor.

7. In a high speed camera having an exposure opening, means for maintaining unexposed and exposed individual films in packs, a motor, a normally tensioned shutter, a focal mirror operatively positioned across said exposure opening, and manually operated means for releasing the focal mirror to permit its movement out of the lens field, means operative during this movement for releasing the shutter to make an exposure, said manually operated means also operating to close a circuit to start said motor, said motor having connections for automatically lifting an exposed film to the exposed film pack for storage, moving the focal mirror over to its operative position, resetting the shutter for another exposure and for stopping the motor.

8. A camera of the class described comprising means for holding packs of exposed and unexposed individual films, a shutter, means for focusing by observation from a side of said camera, manually controlled means for making an exposure, and for starting a power unit, power means for lifting the exposed film to the said exposed pack, means controlled by said last named means for resetting the focusing means and the shutter, and means for automatically stopping said power means.

9. In a reflecting camera having an exposure opening, a magazine for holding packs of films, with one pack coincident with said exposure opening, a reflecting focal mirror operatively occupying a position diagonally across said exposure opening; a coordinating translucent focal screen plate constituting a side of said camera and upon which the subject is reflected, a shutter, a motor, manually operated means for releasing said focal mirror, means for swinging said mirror across the exposure opening clear of the lens field, means operated by the movement of said mirror for releasing the shutter to make an exposure, means controlled by said manually operated means for starting said motor, means operated by the motor for moving progressively exposed films from one of said packs to another, power means for restoring the focal mirror across the exposure opening, means for resetting the shutter for a subsequent exposure and means for stopping the motor.

10. In a camera having an exposure opening, a magazine for holding separated packs of films, a reflecting focal mirror operatively disposed diagonally across said exposure opening, a translucent screen plate constituting a side of said camera and on which the focused subject is reflected, means for swinging said reflecting focal mirror across and to one side of the said exposure opening, means for causing the shutter to make an exposure, means for moving the exposed film from its pack, and means for resetting the said focal mirror and shutter.

11. In a camera having an exposure opening, a shutter, a magazine for yieldingly supporting unexposed and exposed films in respective remote packs, a framed mirror mounted to swing across and close said exposure opening, a hinge bar supporting said mirror, arms secured near the upper and lower ends of said bar, the upper arm having a tripping nose, a link, a lug thereon, said link being pivoted to said upper arm, a motor, a motor driven rotary gear, a disk formed therewith, a pin on said disk and rotating in the path of said lug to draw the link downwardly and restore said mirror to its operative position after an exposure has been made, means for locking the mirror in its operative position, means for moving said mirror to the open folded position when said locking means is released, means when the mirror is moving toward its folded position for releasing the shutter to make an exposure and means for resetting said shutter.

12. In a focal plane reflecting camera, the combination with films arranged in packs, a settable shutter, a settable reflecting focal mirror, a focal screen, a motor, a motor switch, manually controlled means for releasing the focal mirror, and means operable by the folding movement of the focal mirror for releasing said shutter to make an exposure, and further means operable by the release of said manual control means for closing said motor switch to start said motor, power driven means for moving the successive films from one of said packs to another, power means for resetting the shutter and said focal mirror and for breaking the said circuit to stop the motor.

13. The method of photographing, in a focal plane reflecting camera provided with packs of individual films or plates; comprising first focusing the subject by reflection from the axis of the lens field; then manually operating a means to release the reflecting means for movement out of the lens field, simultaneously manually maintaining said operating means to then cause the release of a shutter to make an exposure, then, in sequence to initiate a source of power; then employing said power for moving the exposed film from one of said packs to the other; thereafter restoring the reflecting means to the focusing position, then setting the shutter for another exposure, and finally stopping the power source.

14. In a plane reflecting camera provided with a plurality of films in a magazine, means for focusing the subject by reflection from the axis of the lens field to a side screen, means for manually causing the reflecting means to move out of the lens field, said reflecting moving means operating to release the shutter to make an exposure, means for numbering the film by a separate indexing exposure, a source of power, means for controlling the same, means operated by said power for moving the exposed film from exposed to a non-exposed position, means controlled by said power for restoring the reflecting means to the focusing position, for preparing the shutter for another exposure, and for stopping the power.

15. In a high speed camera having an exposure opening; in combination means for holding individual films at said opening; a shutter; focusing means; primary motive means for making an exposure; a secondary motive means, and means for initiating the same in the said exposure operation; driving means operable by said secondary motive means for moving an exposed film away from the exposure opening, for restoring the focusing means and the shutter, and for automatically stopping the secondary motive means.

16. In a high speed camera having an exposure opening; in combination means for supporting individual films to register with said opening; a tensioned shutter; a tensionally controlled focal device; primary motive means; secondary motive means; tripping means and connections for releasing the shutter and focal device when the primary motive means is operated for making an exposure and for initiating the secondary motive means; driving means and connections associated with said secondary motive means for resetting the said tensioned shutter and focal device for stopping the said motive means.

17. In a high speed camera having an exposure opening; in combination, means for holding films to said opening; settable parts for making an exposure; hand controlled means and connections for releasing said settable parts; secondary power means and connections initiated by the operation of the primary power means for moving an exposed film from the exposure opening; for restoring the said parts for a subsequent exposure and for automatically stopping the operation of said secondary power means.

18. In a plane reflecting camera, in combination, coacting elements including a shutter for making an exposure; a manually controlled primary power means for operating said elements and shutter and a secondary power means operatively corelated with said primary power means for restoring said elements and for automatically stopping the operation of said secondary power means.

19. The method of photographing, in a camera having an exposure opening; comprising first initiating a pressure power means, employing the power means for causing movements in the camera parts for effecting an exposure, automatically initiating a second power means, employing said second power means for restoring the exposure effecting means, and finally stopping said restoring means.

20. In a camera having an exposure opening; in combination, cooperant mechanism including a primary manually controlled power unit for effecting an exposure; cooperant mechanism including a secondary electro-responsive power unit for removing an exposed film, for restoring the exposure effecting mechanism, and for stopping said secondary power unit.

21. In a camera having an exposure opening; the combination of cooperant mechanism for making an exposure, and cooperant mechanism for resetting the exposure making mechanism, including operatively corelated primary and secondary power units for operating respectively the exposure making mechanism and the resetting mechanism; and means for automatically stopping said secondary power unit.

22. In a high speed magazine camera in combination means for storing films in exposed and unexposed positions; exposure effecting parts including a shutter, pressure supply means and controlled devices automatically coactive and sequentially operable for releasing the exposure effecting parts, for exposing a film located in the unexposed position, for moving the said film to the exposed position; for resetting the exposure effecting parts and for stopping the resetting operation.

23. In a high speed camera in combination means for storing packs of individual films in unexposed and exposed positions, a shutter; a power unit, a hinged focal device; pressure supply means and connections automatically coactive and operable for sequentially releasing the focal device, releasing the shutter to make an exposure, and for initiating the power unit; power drive associated parts for moving the exposed film to the exposed position, for resetting the focal device and shutter and for stopping said power unit.

Signed at New York in the county of New York and State of New York this 31st day of January, 1931 A. D.

SAMUEL I. SAX.